Feb. 17, 1953  B. J. AINSWORTH ET AL  2,629,086
TIRE PRESSURE RESPONSIVE SAFETY DEVICE
Filed July 21, 1950  2 SHEETS—SHEET 1
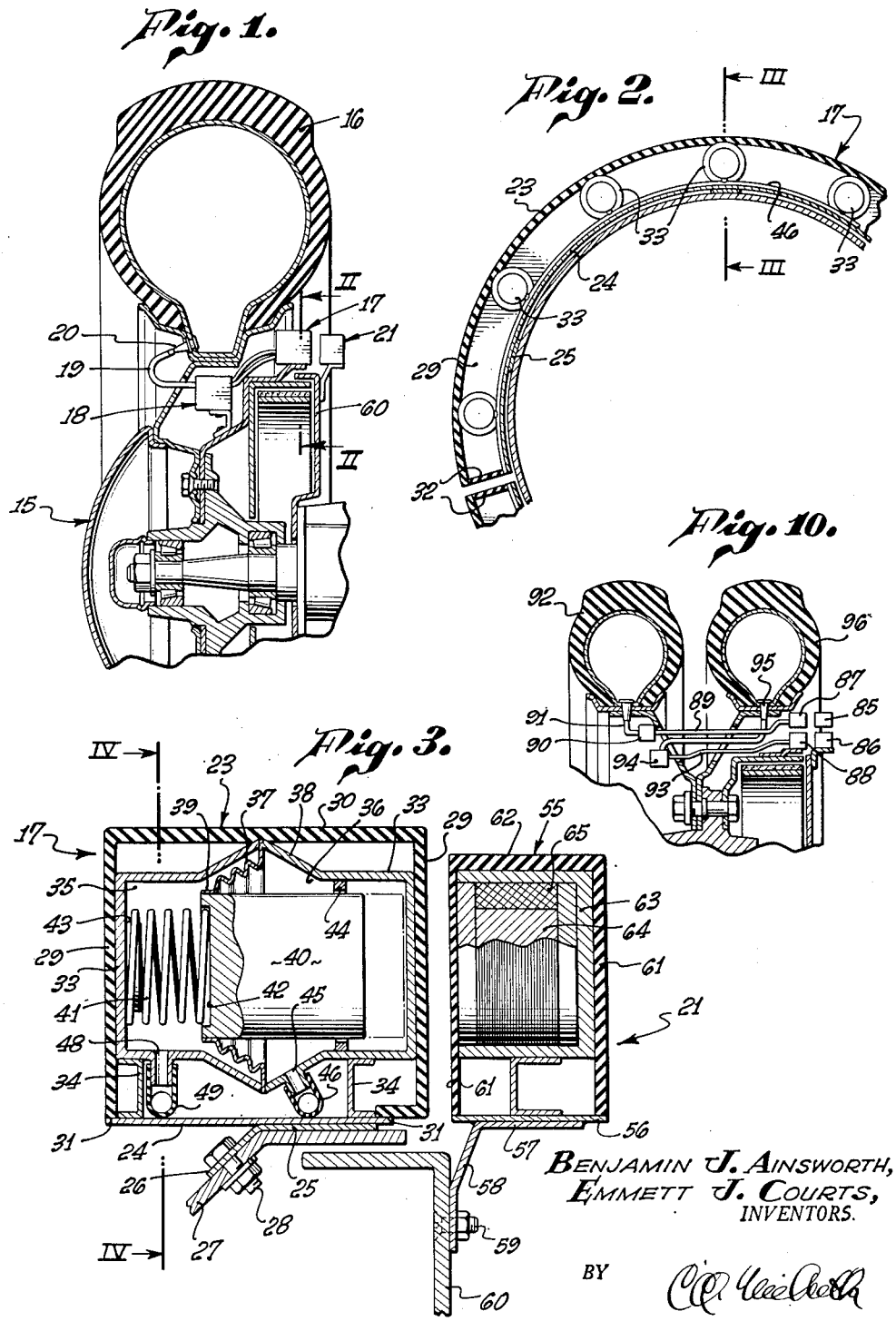
BENJAMIN J. AINSWORTH,
EMMETT J. COURTS,
INVENTORS.
BY
ATTORNEY.

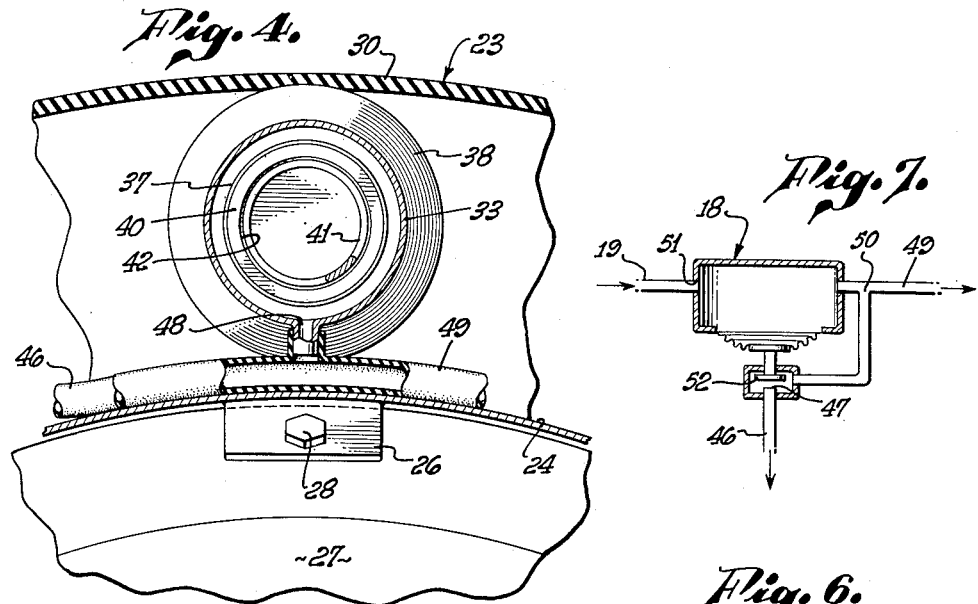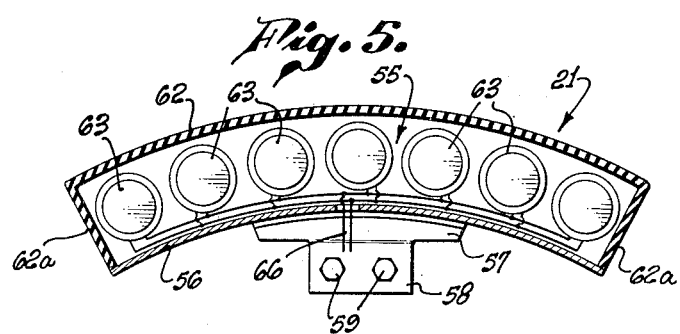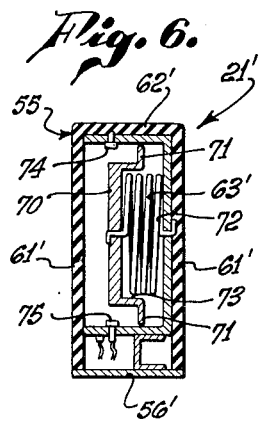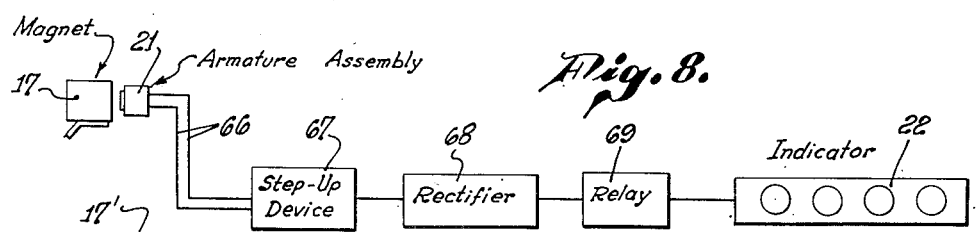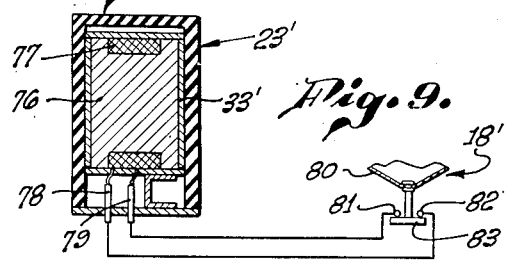
Benjamin J. Ainsworth,
Emmett J. Courts,
INVENTOR.

Patented Feb. 17, 1953

2,629,086

UNITED STATES PATENT OFFICE 2,629,086

TIRE PRESSURE RESPONSIVE SAFETY DEVICE

Benjamin J. Ainsworth and Emmett J. Courts, Los Angeles, Calif.; said Courts assignor to said Ainsworth Application July 21, 1950, Serial No. 175,042

6 Claims. (Cl. 340—58)

This invention relates to an improved pneumatic pressure responsive safety and signalling device utilizing magnetic means. In particular, the invention relates to a safety device responsive to pressure variations above and below a selected operating pressure range in pneumatic systems, such as vehicle and aircraft tires.

It is very important to maintain a selected air pressure in tires during operation of a vehicle. Pressure variations either above or below a selected operating pressure may become extremely dangerous if the vehicle is operated for any sustained period of time at other than the selected pressure. Since vehicles may travel several hundred miles before making a stop for service and road inspection of the vehicle, a dangerous pressure condition of the tires may be created and be present without knowledge thereof by the operator for a relatively long period of time. Immediate warning to the operator of such a dangerous condition is extremely valuable. If pressure is above that specified, a blow-out causing loss of control of the vehicle may result in costly damage and expense both to equipment and to life. Operation of the tires at low pressure for any period of time will produce more rapid breakdown of the wall structure of the tire, increased wear, and will result in a considerable shortening of the life of the tire. In addition, operation of a vehicle with tires at low pressure will become sluggish and maneuverability is difficult and impaired. Because this problem is highly important to efficient operation of vehicles, owners of large fleets of trucks emphasize frequent inspection and maintenance of proper tire pressure on their vehicles during operation. Maintenance of proper tire pressure in aircraft landing wheels is also extremely important since variation therefrom may result in an unsuccessful landing and destruction of equipment and life.

Prior devices responsive to tire pressure changes have included various electrical and mechanical arrangements for signaling a change in tire pressure to the operator of the vehicle. Those prior devices employing electrical means have been characterized by the provision of cooperative electrical contact means mounted respectively on a wheel and on a stationary portion of an axle of an assembly. Such contact means usually include a metal ring and a brush or other element adapted to physically contact the ring to provide an electrical connection. This type of device is necessarily inconsistent in operation because of accumulation of road dust, dirt, grease, and oil on the contact elements resulting in a poor electrical connection which may or may not be completed to actuate signaling means. Such devices are unreliable under conditions of bad weather or bad roads.

Some prior mechanical means have included arrangements responsive to tilting of a wheel and axle assembly due to loss of pressure in one of the tires. Such arrangements are not positive in operation and require some means for making the device unresponsive to variations in road surface. In other prior mechanical devices, means on a wheel responsive to pressure variations were arranged to physically contact cooperable stationary means on the axle assembly for actuating signalling means.

The primary object of this invention is to design and provide an improved pressure responsive alarm or safety device for use with pneumatic inflated tires wherein the disadvantages of the prior devices are obviated and which is efficient, effective, and positive in operation.

An object of this invention is to design and provide a pressure responsive alarm device which is automatically operable to indicate variation in pressure, including an increase or decrease in pressure, for each tire of a vehicle.

Another object of this invention is to provide a pressure responsive safety device which is readily adapted for installation on either a single or a multi-tire wheel assembly.

Still another object of this invention is to provide a device as mentioned above wherein the operator is immediately and automatically signalled by means employing magnets when pressure in a tire either exceeds or becomes less than a narrow selected pressure operating range.

A further object of this invention is to provide a pressure responsive device designed to operate under unfavorable conditions of snow, ice, mud or sleet, the structure of the device being so arranged as to reduce to a minimum accumulation of large, heavy quantities of foreign matter which might unbalance the wheel and cause damage to various parts of the structure of the device.

This invention contemplates a pressure responsive safety device capable of automatic effective operation so as to reduce maintenance on tires, to accurately and immediately indicate variations from the operating range of tire pressures, to afford increased wear and longer life on tires, and to greatly increase the safety of operation of vehicles.

A further object of this invention is to design and provide a pressure responsive safety device utilizing magnet means and alarm signal means actuated by variation in the fields of force of the magnet means and wherein physical contact between parts of the device mounted respectively on a wheel and on an axle is not required.

Generally speaking, this invention contemplates mounting a magnet element on a wheel for rotation with the tire and mounting an armature responsive to magnetic variations on a stationary part of the axle assembly in proximity to the path of travel of the magnet element. The magnet element is made responsive to variations in pressure of an associated tire by means of a pressure responsive device operably associated with the tire and with the magnet element. Such a response may be characterized by a change in flux density of the magnet element or by movement of a permanent magnet element to effect a change in the magnetic field to which the armature is subjected each time the magnet element is rotated past the armature. The response of the armature is suitably amplified for energization of a signal, such as a lamp located on the dash board of a vehicle, where it can be readily observed by the operator of the vehicle.

Other objects and advantages of this invention will be readily apparent from the following description of the drawings:

In the drawings:

Fig. 1 is a fragmentary sectional view of a wheel and axle assembly carrying a pneumatic tire and illustrating a device embodying this invention.

Fig. 2 is a fragmentary enlarged sectional view taken in a vertical plane indicated by the line II—II of Fig. 1 showing an arrangement of magnet means carried by the wheel assembly.

Fig. 3 is an enlarged sectional view through one of the magnet means taken in a plane indicated by line III—III of Fig. 2.

Fig. 4 is an enlarged fragmentary view taken in the plane indicated by line IV—IV of Fig. 3.

Fig. 5 is an enlarged sectional view showing armature means carried by a stationary part of an axle assembly.

Fig. 6 is an enlarged sectional view of a different modification of armature means arranged as illustrated in Fig. 5.

Fig. 7 is a schematic view of a pressure responsive valve assembly carried on the wheel.

Fig. 8 is a diagrammatic view of an exemplary electrical arrangement for amplfying the response of the armature means for operation of signaling means.

Fig. 9 is a sectional and partially diagrammatic view of a different modification of magnet means and pressure responsive switch means which may be substituted for the magnet means shown in Fig. 1.

Fig. 10 is a schematic view of a dual wheel assembly embodying this invention.

A preferred modification of this invention is illustrated in Fig. 1, which includes, generally speaking, a wheel and axle assembly indicated in its entirety at 15, carrying a well-known type of pneumatic inflated vehicle tire 16. The wheel of assembly 15 carries a magnet means generally indicated at 17, operably associated with a pressure operated valve or switch means 18 also carried on the wheel, said valve means 18 being removably connected by suitable tubing 19 to air valve 20 of the tire. On the stationary part of the axle of assembly 15 is carried armature means 21 disposed in proximity to the path of travel of magnet means 17. The armature means 21 is suitably connected, as diagrammatically shown in Fig. 8, to signaling or indicating means 22 normally carried on the dash board of the vehicle for observation by an operator. The term "armature means" is meant to generally include any material or arrangement capable of being responsive to a magnetic field being revolved past the armature means and which may or may not be provided with a coil winding.

The magnet means 17 includes an elongated hollow flexible tubular housing 23 of rectangular cross-section for bending to virtually form a torus or circle concentric with the axis of the wheel and axle assembly. Housing 23 includes a bottom wall of a suitable bendable metal band 24 provided with spaced brackets 25 secured to the under-surface of band 24 as by welding. Each bracket 25 is provided with a downwardly turned or radially inclined portion 26 adapted to be secured to a flanged disc 27 of the wheel assembly by any suitable securing means, such as welding or by nut and bolt assemblies 28 shown.

The housing 23 also includes integral side walls 29 and a connecting top wall 30 formed of a flexible weather resistant and waterproof material as for example, rubber composition, plastics or the like. The side walls 29 are preferably bonded to the metal band 24 as at 31 to provide a weather proof juncture. Obviously, the housing may be removably secured to the metal band by any convenient well-known securing means, such as screws or nut and bolt assemblies. The housing 23 also includes end walls 32 provided at ends of band 24. Thus, housing 23 provides an elongated bendable housing having a smooth outer surface on all sides upon which foreign matter, such as ice, slush, sleet and dirt will tend to slip from and upon which such matter will not tend to accumulate to unbalance the wheel or damage parts of the device. It should also be noted that since the housing is flexible, installation is facilitated because a standard housing may be made readily adaptable to wheels of different diameters inasmuch as a continuous circle is unnecessary and installation of a partial circle formed by housing 23 may be employed.

A plurality of spaced generally cylindrical hollow casings 33 are carried by the band 24 within the housing. Each casing 33 is supported above the band by suitable saddle members 34 (Fig. 3). Each casing 33 is divided into a high pressure chamber 35 and a low pressure chamber 36, said chambers being separated by a flexible, resilient, impervious diaphragm 37 having outer radial margins secured in any convenient manner to a central expanded portion 38 of the casing 33. The inner radial margins of diaphragm 37 are suitably secured as by bonding at 39 to outboard end margins of a generally cylindrical permanent magnet 40 of suitable magnetic material such as metal alloys including aluminum, nickel, and iron.

The permanent magnet 40 is spring biased for reciprocal sliding movement along an axis parallel to the axis of the axle assembly by a compression spring 41 in chamber 35 and having one end positioned in circular recess 42 formed in the outboard end of magnet 40 and the other end encircling a circular boss 43 formed on the inner surface of the outboard end wall of casing 33. Axial movement of magnet 40 is guided by a bearing ring 44 encircling the inboard end of magnet 40 within the low pressure chamber 36.

Each low pressure chamber 36 is provided with a port 45 suitably connected to a conduit 46 extending along the bottom wall of the housing and in communication with a low pressure port 47 (Fig. 7) of the pressure operated valve 18. Each high pressure chamber 35 is likewise provided with a port 48 in communication with a conduit 49 extending along the housing and connected to a high pressure port 50 on valve 18. Thus respective chambers in each casing are connected in communication with each other and with the valve 18.

The pressure responsive valve 18 of well known type and diagrammatically indicated in Fig. 7, includes in addition to ports 47 and 50, an inlet port 51 connected to flexible tubing 19 which is connected to the air valve 20 of the tire. Tubing 19 is provided with a valve member (not shown) adapted to hold air valve 20 in open position so that air pressure within the tire is communicated through tubing 19 to valve 18. The valve 18 is of well-known type wherein ports 47 and 50 are normally open for communication of tire air pressure with respective pressure chambers 35 and 36 in each casing 33 for equalization of pressure therein when the tire is at normal operating pressure. Under this condition the magnet element 40 is in retracted position as illustrated in Fig. 3, the forces of biasing spring 41 being overcome by the operating pressure in chamber 36. Such a valve 18 includes a diaphragm actuated valve element 52 responsive upon increase of tire pressure beyond the operating range to close the low pressure port 47.

The armature means 21 carried on the stationary portion of the wheel and axle assembly 15 are disposed in opposed and close proximity to the plane of the path of travel of magnet means 17 for intercepting magnetic lines of force produced by magnets 40 and to which the armature means are responsive as the magnets 40 revolve past the armature means. Armature means 21 may comprise an arcuate hollow housing 55 including an arcuate metal band 56 having a supporting bracket 57 secured thereto as by welding. The brackets 57 include a radially inwardly directed leg 58 arranged to be suitably secured as by nut and bolt assemblies 59 to a stationary portion of the axle assembly such as a brake drum cover 60. The housing 55 also includes arcuate side walls 61 suitably secured to the band 56, connected by a top wall 62, and at opposite ends by end walls 62a. The side walls 61 and the top wall 62 are preferably formed of a weather resistant, waterproof material affording on the exterior surfaces thereof a smooth surface upon which accumulation of foreign matter is reduced to a minimum.

Within the housing 55 and carried by the band 57 are provided a plurality of generally cylindrical spaced casings 63, each casing enclosing a soft iron core 64 having a coil winding 65 wrapped therearound. The ends of each coil 65 are electrically connected to leads 66 (Fig. 8) affording an electrical connection to means for amplifying the response of the armature means 21 to the magnet elements 40 to energize the signalling means 22.

An exemplary amplifying means may include a stepup device 67, such as a transformer, a rectifier 68, and a normally open latch type relay 69. The relay 69 when actuated to closed position by amplified current from the response of the armature means is preferably arranged to require manual resetting. Closing of relay 69 completes an auxiliary battery circuit which energizes a respective signal lamp included in the signaling means 22. The signaling means 22 is provided with a signal lamp for each tire and is mounted on the instrument panel of the vehicle for convenient observation by an operator. Obviously, various other methods and electrical means may be employed to amplify the response of the armature means for actuation of the signaling means.

In operation of the safety device described above, under a condition wherein the tire pressure decreases below a selected operating range, such loss of pressure is immediately communicated to and through pressure valve 18 by tubing 19 and conduits 46 and 49 to pressure chambers 36 and 35 in each casing 33. Since each spring 41 is selected to maintain the associated magnet 40 in retracted position at a predetermined operating pressure, decrease of pressure in chambers 35 and 36 will cause the spring to exert a force on the magnet to move it axially inboardly toward the armature means 21 and against the inboard internal face of casing 33. Such movement of each magnet 40 changes the relative position of the armature means with respect to the magnetic field of each magnet. As a result, each coil 65 has induced therein a temporary current by each passing magnet 40. This current is of a pulsating nature because of the fact that a plurality of magnets 40 are rapidly and sequentially rotating past the armature means.

In normal inoperative position armature means 21 may be intercepting an extremity of the magnetic field of the magnets. When magnets 40 are actuated to operative position the armature means will intercept a stronger or different portion of the magnetic field and thus a current change is produced in coils 65. This current is then amplified by device 67 for actuating the latch type relay 69 to closed position, the relay 69 being connected to an auxiliary battery circuit and when actuated closes said circuit for energizing the respective signal lamp in signaling means 22.

Under a condition where tire 16 becomes hot and tire pressure increases beyond a selected range, valve element 52 of valve 18 is actuated into a position for closing the low pressure port of the valve 18, thus sealing off the several low pressure chambers 36 in casings 33 to prevent communication of the high pressure thereto. The increased pressure of the tire is then communicated only through the high pressure port of valve 18 to the high pressure chambers 35 in each casing 33. The differential in pressure between the low pressure chamber and the high pressure chamber 35 causes each magnet to move axially inboardly toward the armature means 21, thus producing the same movement of magnet 40 as that produced by spring 41. The response of the armature means 21 is identical to that described above with respect to the operation of the device under low pressure tire conditions and the signaling means indicates to the operator that the respective tire is under a pressure different from the selected operating range.

A different arrangement of the pressure responsive alarm device and in particular of the armature means is shown in Fig. 6. The armature means 21' (Fig. 6) may be substituted for the armature means 21 described in the first modification while the magnet means 17 and pressure-operated valve 18 may be identical to that described in the first modification and actuated in the same manner.

The armature means 21' comprises an arcuate housing 55' having an arcuate flexible metal band 56' forming the bottom wall of housing 55'. Housing 55' comprises side walls 61' and a top wall 62' and encloses therewithin a plurality of cylindrical casings 63' supported by brackets from the band 56'.

Within each casing 63' is provided a circular metal disc 70 capable of being attracted by a permanent magnet. The disc 70 is provided with an inboardly offset radial outer circumferential flange 71, the circumferential edges of which slidably engage the internal surface of the casing. Disc 70 is spring-biased to retracted inboard position by a tension spring 72 positioned on the inboard wall of the casing by any suitable securing means. The opposite end of the spring may be secured to the opposed face of the disc 70 and is positioned within a recess 73 formed by the flange 71.

Between the outboard edge of casing 63' and the retracted position of the radial flange 71 a pair of electrical contact terminals 74 and 75 project within the casing 63' for engagement with circumferential margins of flange 71 when the disc 70 is moved axially outboardly under the influence of the magnet means 17. Terminal 74 may be electrically connected to a source of current, such as an automobile battery and terminal 75 to ground. While only one pair of contact terminals have been shown, it is understood that a plurality of sets of such terminals may be provided at diametrically opposed points in the casing to provide positive making of an electrical connection by disc 70, said disc, in effect, acting as a switch means.

In operation, when the magnets 40 in the magnet means 17 carried by the revolving wheel are actuated in response to tire pressure variation into position against casing 33, each disc 70 is axially slidable outboardly toward magnets 40 as a result of magnetic attraction thereto. Outboard movement of discs 70 is stopped by abutment of radial flange 71 against terminals 74 and 75 and an electrical connection between terminals 74 and 75 is thus provided by the disc 70. Disc 70 thereby operates to close an auxiliary battery circuit which may be arranged as in the first modification to include a latch-type relay for permanently lighting a signal lamp on the indicating means carried on the dashboard.

A modification of magnet means 17 is illustrated in Fig. 9 and is generally indicated at 17'. Magnet means 17' may be employed with an armature means 21, as described in the first modification, said armature means including a soft iron core 64 and a coil winding 65. In the present modification, a pressure operated electrical switch 18' is employed instead of the pressure operated valve 18 of the first modification for causing response of the magnet means 17' to tire pressure variations.

In this modification a housing 23' encloses a plurality of spaced cylindrical casings 33' virtually similar to housing 23 and casings 33 of the first modification and may be supported in the same manner as described thereabove. In the present modification each casing 33' carries a permanent magnet 76 having a coil winding 77 therearound, each end of coil 77 being connected to a respective electrical lead 78 and 79 diagrammatically indicated. A pressure operated electrical switch 18' of well-known form may include a bellows 80 responsive to tire pressure variations and terminals 81 and 82 for the leads 78 and 79 respectively.

In this modification when pressure in the tire decreases, the bellows of the pressure operated switch 18' is actuated to short coils 77 by moving a switch element 83 into contact across the terminals 81 and 82. Shorting of coils 77 wound around permanent magnets 76 modifies the flux density of the magnetic field of permanent magnets 76. As the magnetic means 17' revolve with the wheel past the armature means 21 this variation in flux density of the permanent magnets 76 causes a change in the current characteristics intermittently flowing in the winding of the armature means 21. This change in current characteristics is amplified and may be used to actuate a latch-type relay by any suitable well-known means for causing energization.

While the above modifications have been directed to installations of this pressure alarm device on a wheel and axle assembly embodying a single wheel, it will be readily understood by those skilled in the art that this device may also be employed on dual wheel assemblies to indicate tire pressure variations in each tire of dual wheel assembly. Such an installation for a dual wheel is diagrammatically indicated in Fig. 10 wherein armature means 85 and 86 may be mounted concentrically on the axle assembly and respective magnet means 87 and 88 likewise mounted in respective opposed position on the wheel to the armature means. Magnet means 87 is connected by a conduit 89 to a pressure operated valve or switch 90 connected by tube 91 to the outer tire 92. Magnet means 88 is connected by a conduit 93 to a pressure operated valve or switch 94 connected to the extension valve 95 of the inner tire. The operation of each cooperable magnet means and armature means is the same as described above for the other modifications. Obviously, other arrangements of a pair of pressure responsive safety devices may be employed to indicate pressure variations in each tire of a multi-tire wheel and axle assembly.

The strength of the permanent magnets and size of coil windings employed on the magnets and on the armature means are selected to be sufficient to develop current and voltage in the armature means for actuation of the signaling means when the vehicle is being driven at relatively low speeds. The number and spacing of the magnets and armature elements may be varied, and if desired, only one magnet and one armature may be employed.

The various modifications of the tire pressure safety device disclosed above are readily and conveniently installed on any wheel and axle assembly. Since the device is housed in weather resistant, waterproof housings, dirt, dust, ice and snow will not affect operation of the device. Normally, the gap between the magnet means and the armature means is relatively small; for example, one quarter of an inch. Physical contact is eliminated between parts of the device carried on the rotating wheel and parts carried on the stationary axle assembly.

The tire pressure safety device disclosed above is positive and efficient in operation for signaling to an operator of the vehicle a dangerous pressure condition in a vehicle tire. Immediate knowledge of this condition enables the operator to inspect the tire to correct a dangerous condition before an accident may occur.

It should be noted that any of the above modifications may be employed for use with aircraft tires whereby any change in tire pressure above and below a selected safe operating pressure range may be immediately indicated to a pilot. In such an aircraft installation it is contemplated that rotating landing wheels, when retracted to flying position, may be stopped in a position so that a magnet element is disposed oppositely to an armature element. Thus, any tire pressure change beyond a selected operating range would cause actuation of the magnet element and the armature element, being responsive to actuation of the magnet, would immediately indicate through the signaling means the dangerous condition to the pilot.

It is understood that numerous and various modifications and changes may be made in the arrangement of the permanent magnets and the armature elements responsive thereto. Also, various other amplifying and signaling means may be employed to utilize the response of the armature means for actuation of a signaling means. All such modifications coming within the scope of the appended claims are embraced thereby.

We claim:

1. In a tire pressure safety device, the combination of: magnet means adapted to be carried by a wheel in concentric relation thereto and for rotation therewith including an annular hollow flexible housing adapted to virtually encircle the axis of the wheel; a plurality of casings carried within the housing in spaced relation and with their axes parallel to the axis of the wheel, a flexible diaphragm dividing each casing into opposed high and low pressure chambers, each chamber being normally in communication with a tire carried by the wheel; a spring biased permanent magnet element connected to said diaphragm and axially movable within each low pressure chamber in response to variation of tire pressure beyond a preselected operating range; and armature means adapted to be carried on a stationary axle assembly in proximity to the plane of the path of travel of said magnet means, said armature means being responsive to axial movement of each magnet element for causing energization of a signaling means.

2. A device as defined in claim 1 wherein communication between said low pressure chambers and the tire is blocked when tire pressure increases whereby increased pressure in each high pressure chamber causes axial movement of the magnet element toward the armature means.

3. A device of the character defined in claim 1 wherein the armature means includes a magnetic core and a coil wound therearound, a flexible hollow arcuate housing enclosing said core and coil, and amplifying means connected to said armature means.

4. In a tire pressure responsive device for indicating pressure above and below a selected operating range, the provision of: a flexible, hollow, annular housing virtually adapted to encircle the axis of a wheel and axle assembly and to be secured to said wheel for rotation therewith, said housing presenting an inboard virtually smooth annular face lying in a plane perpendicular to the axis of the wheel; a plurality of spaced hollow casings carried within said housing with their axes parallel to the axis of the assembly; a transversely arranged flexible diaphragm within each casing for dividing the casing into high and low pressure chambers; a permanent magnet element slidably mounted in each low pressure chamber for axial movement and connected to said diaphragm; a spring means in each high pressure chamber biasing said magnet element; a fluid pressure inlet to each high and low pressure chamber; pressure responsive valve means selectively connected to said pressure inlets and to an associated tire on the wheel; a hollow arcuate housing adapted to be secured to a stationary portion of said axle assembly and presenting an arcuate smooth surface normally opposed to a portion of said annular face; a plurality of armature means carried within said arcuate housing and responsive to axial movement of said magnet elements; means for amplifying response of said armature means; and signaling means connected to said amplifying means.

5. In a tire pressure responsive device for indicating pressure above and below a selected operating range, the provision of: a flexible, hollow, annular housing virtually adapted to encircle the axis of a wheel and axle assembly and to be secured to said wheel for rotation therewith, a plurality of spaced hollow casings carried within said housing with their axes parallel to the axis of the assembly; a transversely arranged flexible diaphragm within each casing for dividing the casing into high and low pressure chambers; a permanent magnet element slidably mounted in each low pressure chamber for axial movement and connected to said diaphragm; a spring means in each high pressure chamber biasing said magnet element; a fluid pressure inlet to each high and low pressure chamber; pressure responsive valve means selectively connected to said pressure inlets and to an associated tire on the wheel; a hollow arcuate housing adapted to be secured to a stationary portion of said axle assembly; a plurality of armature means carried within said arcuate housing and responsive to axial movement of said magnet elements; means for amplifying response of said armature means; and signaling means connected to said amplifying means.

6. In a tire pressure responsive device, the provision of: a flexible hollow annular housing adapted to virtually encircle the axis of a wheel and axle assembly and to be secured to said wheel for rotation therewith; a plurality of spaced hollow casings carried within said housing; flexible means within each casing to form high and low pressure chambers; magnet means axially movable in each low pressure chamber and connected to said flexible means; spring means biasing each magnet means; pressure responsive valve means selectively connected to the high and low pressure chamber of each casing and to an associated inflatable tire on the wheel; a plurality of arcuately arranged armature means carried on said axle assembly in opposed relation to said annular housing and responsive to axial movement of said magnet means; and signalling means energized by response of said armature means to said movement of said magnet means.

BENJAMIN J. AINSWORTH.
EMMETT J. COURTS.

REFERENCES CITED

The following references are of record in the file of this patent:

UNITED STATES PATENTS

| Number | Name | Date |
| --- | --- | --- |
| 1,683,343 | Gartner | Sept. 4, 1928 |
| 2,040,375 | Guthrie | May 12, 1936 |
| 2,057,556 | Cole | Oct. 13, 1936 |
| 2,439,561 | Cressey | Apr. 13, 1948 |